United States Patent [19]

Vlasak

[11] Patent Number: 4,947,098

[45] Date of Patent: Aug. 7, 1990

[54] REGULATOR MECHANISM FOR A TWO-SPEED MOTOR

[75] Inventor: Robert C. Vlasak, Dallas, Tex.

[73] Assignee: Lennox Industries, Inc., Carrollton, Tex.

[21] Appl. No.: 199,205

[22] Filed: May 26, 1988

[51] Int. Cl.$^5$ .............................. H02P 7/48
[52] U.S. Cl. ......................... 318/775; 318/777
[58] Field of Search .................... 318/773–777

[56] References Cited

U.S. PATENT DOCUMENTS

| | | |
|---|---|---|
| 2,186,254 | 1/1940 | Mahnke ............................ 318/777 |
| 3,016,482 | 1/1962 | Andersen et al. ................. 318/273 |
| 3,935,519 | 1/1976 | Pfarrer et al. |
| 4,066,937 | 1/1978 | Pfarrer et al. |
| 4,082,989 | 4/1978 | Pfarrer ............................. 318/775 |
| 4,263,540 | 4/1981 | Brandt et al. .................... 318/775 |
| 4,384,312 | 5/1983 | Fry .................................. 318/775 |

Primary Examiner—David Smith, Jr.
Attorney, Agent, or Firm—Allegretti & Witcoff, Ltd.

[57] ABSTRACT

An improved regulator mechanism for a single-phase or three-phase, two-speed motor is disclosed. The regulator mechanism includes a first energizable contactor (having at least one contact) and a second energizable contactor (having five contacts) which cooperate to cycle the motor between inoperative and operative states and to configure the motor windings and power lines so as to provide first and second speed operation.

4 Claims, 2 Drawing Sheets

REGULATOR MECHANISM FOR A TWO-SPEED MOTOR

BACKGROUND OF THE INVENTION

The present invention relates generally to a regulator for an apparatus including a two-speed motor and a controller for requesting motor operation, and more particularly to an improved regulator for an air conditioning unit including a single-phase, two-speed compressor.

Numerous regulating mechanisms of this type are presently available. One such mechanism for an air conditioning system is amply described in U.S. Pat. No. 3,935,519 (issued Jan. 27, 1976 and hereinafter "the Pfarrer patent"), and attention is specifically but without limitation directed to FIGS. 1, 2, 6 and 7 and column 3, line 29 through column 6, line 21. This and other pertinent prior art mechanisms include a series of contactors, electrically and mechanically interconnected and interrelated. (As use herein, the terms "contactor", "energizable contactor" and obvious derivatives thereof mean a relay-like mechanism, including a coil and at least one contact having a normal state, e.g., normally open, and all equivalents thereof. When the coil is energized by an electric current, the contact switches to the opposite state.)

In other words, the operation of each contactor in the regulating mechanism is dependent upon the operation or operational state of one or more of the other contactors therein. In the Pfarrer patent, for example, energization of the appropriate contactors for high speed compressor operation electrically and mechanically prevents energization of the low contactor. To achieve this interdependence, the apparatus includes complex interlocking electrical circuitry and mechanical coupling.

SUMMARY OF THE INVENTION

In the principal aspect, the present invention is an improved regulator for a two-speed motor (such as the compressor of an air conditioning unit). The motor may be part of any apparatus including a control mechanism which monitors certain conditions (such as area temperature) and requests, via signalling, operation of the motor at either speed.

The regulator includes a first of C1 energizable contactor having at least one C1 contact and a second or C2 energizable contactor having five C2 contacts. (The terms "C1" and "C2" are used herein solely to identify specific contactors and related contacts.) The C1 and C2 contactors are independent of one another from both and electrical and mechanical perspective. That is, the C1 and C2 contactors are not interlocked by electrical circuitry or mechanical coupling so as to prevent energization of one whenever the other is energized.

The C1 and C2 contactors are independently responsive to the control mechanism and cooperate to define a cycle/configure control. The cycle/configure control responsively cycles the motor, i.e., switches the motor between an inoperative "OFF" state and an operative "ON" state. The cycle/configure control also properly interconnects the motor windings and the lines delivering power to provide the requested low or high speed operation.

The present invention represents a substantial improvement over the prior art from the perspectives of simplicity, reliability, maintenance and costs. The improvement derives primarily from the independence and disassociation of one contactor from the other.

It is thus an object of the present invention to provide an improved, low cost regulator mechanism for a two-speed motor. Another object is a reliable regulating mechanism for a cooling apparatus, such as a heat pump or air conditioning unit. It is a further object of the present invention to provide a regulator mechanism for a two-speed motor utilizing independently-operated and disassociated contactors.

These and other features, objects and advantages of the present invention are described or apparent in the following description.

BRIEF DESCRIPTION OF THE DRAWING

Preferred embodiments of the present invention are described, in detail, with reference to the drawing wherein.

DETAILED DESCRIPTION OF PREFERRED EMBODIMENTS

A preferred embodiment of the present invention is shown in FIGS. 1–4 as regulator means 10 for regulating, in part, an air conditioning unit 12 and more particularly the speed of the compressor 14. The compressor 14 has a first or low speed and a second or high speed and operates on single-phase power. It is to be understood, however, that the regulator means 10 may be incorporated into any single-phase, two-speed motor.

Figure 1:
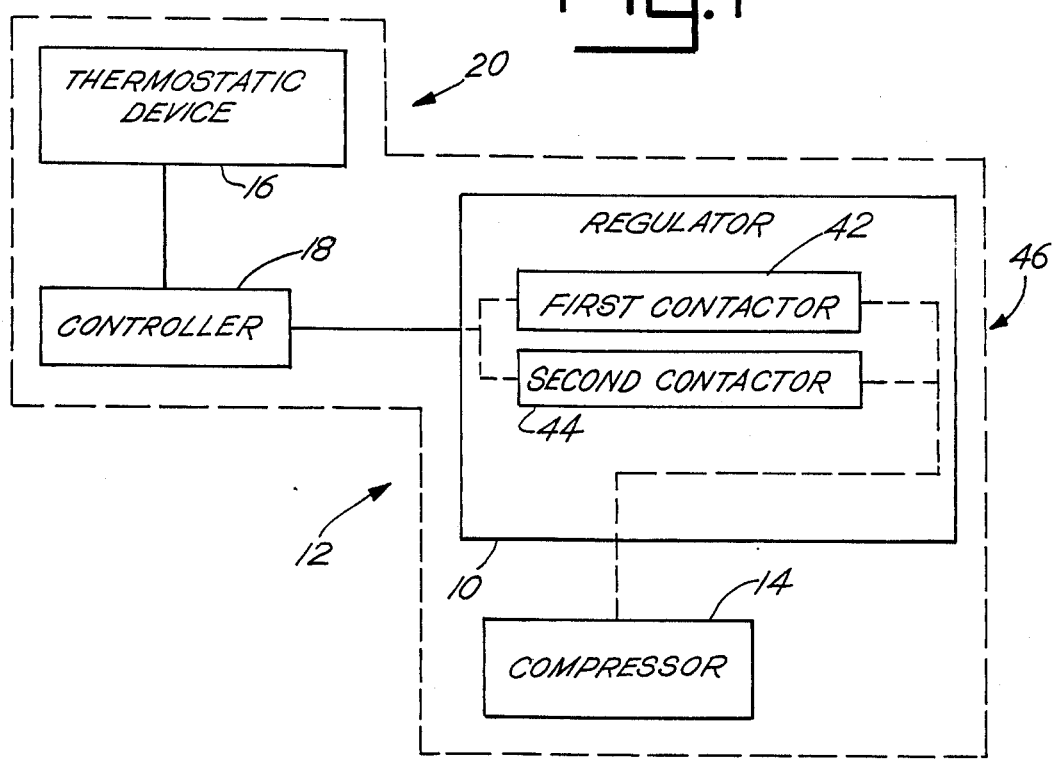
FIG. 1 is a partial schematic diagram of an air conditioning unit including a two-speed compressor, a controller and the present invention.

As best shown in FIG. 1, and as well known in the art, the air conditioning unit 12 includes a thermostatic device 16 within an area (not shown) to be conditioned. The thermostatic device 16 senses area temperature and accordingly provides a signal to a controller 18. The controller 18 responsively provides a signal representing a request for either low speed or high speed operation of the compressor 14, based upon the differential between the desired, set temperature and the actual area temperature.

The thermostatic means 16 and the controller 18 cooperate to define control means, generally designated 20. The control means 20 provides control signals to the regulator means 10 which represent requests for compressor operation at low or high speed.

Figure 2:
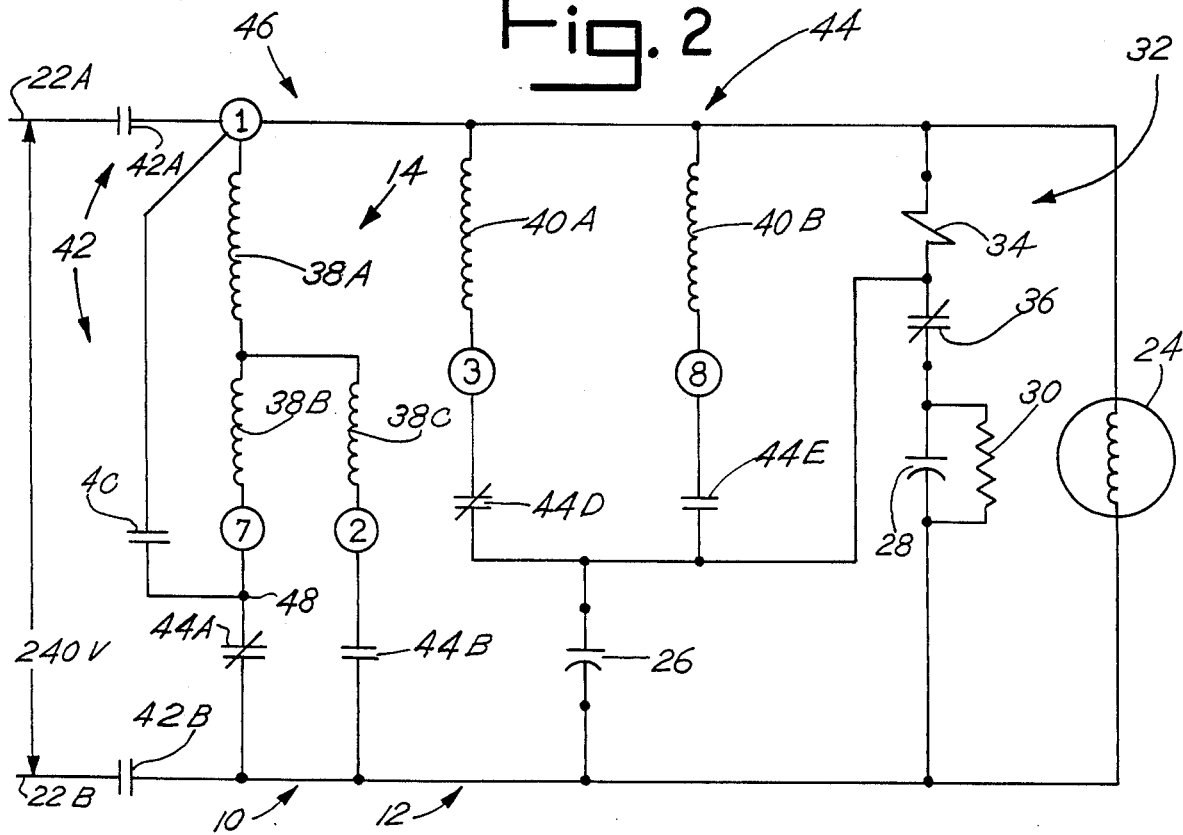
FIG. 2 is a partial electrical schematic diagram of the unit of FIG. 1 and illustrating a single phase compressor.

As best shwon in FIG. 2, the air conditioning unit 12 is provided with a conventional 240 volts over first and second lines 22A, 22B. Each line 22A, 22B carries 120 volts, RMS to ground. the unit 12 further includes a condenser fan motor 24; a run capacitor 26; a starter capacitor 28 in parallel with a resistor 30; a starter relay, generally designated 32 and including a relay coil 34 and contact 36, interconnected as shown.

As is well known in the art, the compressor 14 has a set of three primary windings 38A, 38B, 38C and a set of two secondary windings 40A, 40B, which derive power from the lines 22A, 22B. The secondary windings 40A, 40B are, in this preferred embodiment, low speed and high speed starter windings, respectively. The power lines 22A, 22B, primary windings 38A, 38B, 38C and secondary windings 40A, 40B are arranged in two different configurations depending upon the speed sought and selected by the control means 20.

The primary winding 38C has a small impedance in comparison with the primary windings 38A, 38B, as is also well known. In this preferred embodiment, the compressor 14 is a Model 2B (Single Phase), as marketed by Lennox Industries, Inc. (Dallas, Texas). The circled numbers in FIG. 2 indicate the compressor terminals for that Lennox model.

The starter capacitor 28 facilitates initial motor operation and is subsequently disconnected. With reference to FIG. 2, the capacitor 28 is disconnected when the normally-closed contact 36 of the starter relay 32 opens due to the amount of current flow through relay coil 34.

Referring now to FIGS. 1 and 2, the regulator means 10 includes a first or C1 contactor 42 and a second or C2 contactor 44. The C1 and C2 contactors 42, 44 are indpendent and disassociated, i.e., the contactors 42, 44 are not electrically or mechanically interrelated or interlocked. There is no circuitry to prohibit energization of either the C1 or C2 contactor 42, 44 whenever the other is energized, and there is not mechanical connection or coupling between the C1 and C2 contactors 42, 44 to provide such a prohibition.

The contactors 42, 44 cooperatively define cycle/configure means, generally designed 46. The cycle/configure means 46 is responsive to signals from the control means 20, cycling the compressor 14 between an inoperative or OFF state and an operative or ON state and configuring the compressor 14 for low or high speed operation. More particularly, the cycle/configure means 46 responds to the control means 20 and properly configures the power lines 22A, 22B, primary windings 38A, 38B, 38C and secondary windings 40A, 40B.

The C1 contactor 42 includes at least one C1 contact 42A. As shown in FIG. 2, the C1 contactor 42 includes, in this preferred embodiment, first and second contacts 42A, 42B, which are normally open. When open, the first and second contacts 42A, 42B fully interrupt power to the air conditioning unit 12. The first contactor 42 is energized by an ON or LOW SPEED signal from the control means 20, causing contacts 42A, 42B to close. In response to an OFF signal, or at termination of the LOW SPEED signal, the C1 contactor 42 de-energizes and the contacts 42A, 42B return to the normally-open state.

The C2 contactor 44 includes five sets of contacts 44A, 44B, 44C, 44D, 44E, respectively. In this preferred embodiment, the first and fourth contacts 44A, 44D are normally closed, and the second, third and fifth contacts 44B, 44C, 44E are normally open.

As shown in FIG. 2, the first contact 44A of the C2 contactor 44 interposes the second primary winding 38B and second line 22B, thereby defining a first interconnection point 48. The second contact 44B interposes the third primary winding 38C and second line 22B. The third contact 44C interposes the first line 22A and the first interconnection point 48.

The fourth contact 44D interposes the first secondary winding 40A and run capacitor 26. The fifth contact 44E interposes the second secondary winding 40B and run capacitor 26.

Figure 3:
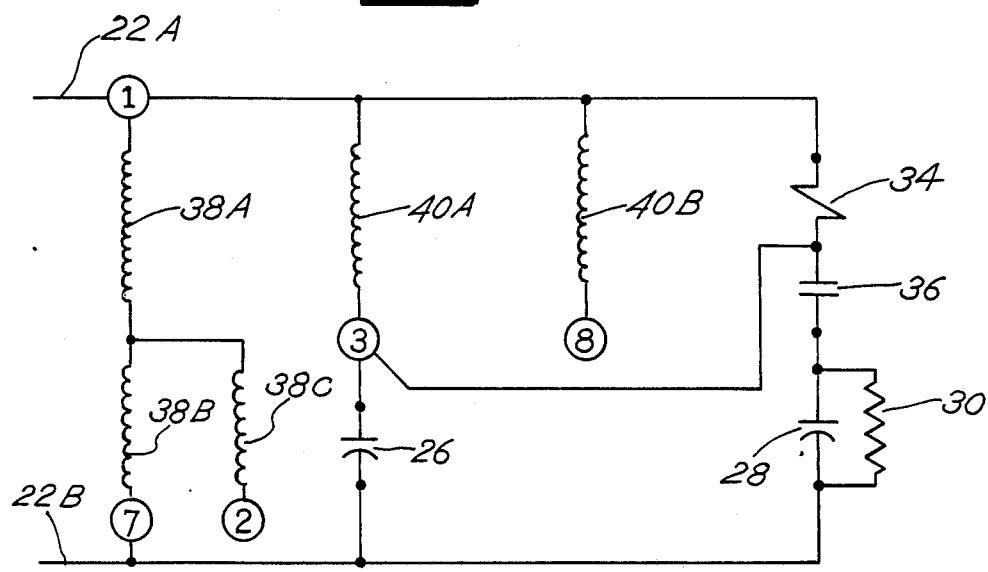
FIG. 3 is the schematic diagram of FIG. 2 simplified to illustrate the low speed configuration.
Figure 4:
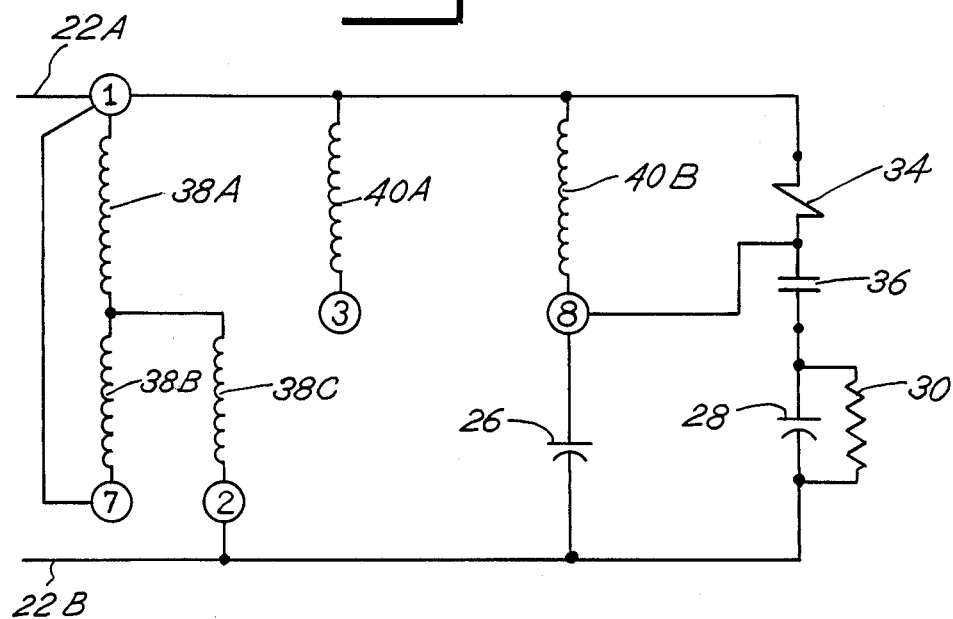
FIG. 4 is the schematic diagram of FIG. 2 simplified to illustrate the high speed configuration.

The C2 contactor 44 remains in the normal, de-energized state in response to a LOW SPEED signal from the control means 20. The compressor configuration in response to an ON signal or a LOW SPEED signal from the control means 20 is shown in FIG. 3. Typically the air conditioning unit 12 operates in the LOW SPEED mode the vast majority of the time (often 90% of the time). Since the C2 contactor 44 is de-energized for such a substantial percentage of operating time, the expected life of the C2 contactor is greatly extended.

The C1 contactor 42 and the are C2 contactor 44 energized by a HIGH SPEED signal from the control means 20. In response, contacts 44A, 44D open and contacts 44B, 44C, 44D close to produce the compressor configuration shown in FIG. 4. Alternatively the C1 contactor may be energized during high speed operation by a separate ON/OFF signal from the control means.

In this preferred embodiment, the fourth and fifth C2 contacts 44D, 44E operate in a make-before-break relationship. That is, the normally-open fifth C2 contact 44E "makes" before the normally-closed fourth C2 contact 44D "breaks" and visa versa. This allows the voltage accros the run capacitor 26, developed during HIGH SPEED operation, to discharge through the condenser fan motor 24 and relay coil 34 and avoids potential damage to the starter relay contact 36.

Preferred embodiments have been described herein. It is to be understood that modifications and changes can be made without departing from the true scope and spirit of the present invention, which are defined by the following claims to be interpreted in view of the foregoing.

What is claimed is:

1. In an apparatus of the type including (i) a single-phase motor having operative and inoperative states, first, second and third primary windings, first and second secondary windings, a run capacitor and first and second speeds, (ii) control means for providing control signals representing requests for operation of said motor at said first and second speeds, and (iii) first and second power lines, said first, second and third primary windings being connected at a common node, said first primary winding also being connected to said first power line, said first and second secondary windings being connected to said first power line, said run capacitor being connected to said second power line, an improved regulating means comprising, in combination:

a C1 energizable contactor, coupled to said control means, having at least a first C1 contact connected to one of said first and second power lines; and a C2 energizable contactor, coupled to said control means, having a first C2 contact, a second C2 contact, a third C2 contact, a fourth C2 contact, and a fifth C2 contact, said first C2 contact of said C2 energizable contactor interposing said seocnd primary winding, opposite said common node, and said second line and defining a first interconnection point between said first C2 contact and said second primary winding, said second C2 contact interposing said third primary winding, opposite said common node, and said second power line, said third C2 contact interposing said first power line and said first interconnection point, said fourth C2 contact interposing said first secondary winding, opposite said first power line, and said run capacitor, said fifth C2 contact interposing said second secondary winding, opposite said first power line, and said run capacitor;

said first and fourth C2 contacts being normally closed and said second, third and fifth C2 contacts being normally open;

said C1 and C2 energizable contactors cooperating to define cycle/configure means, responsive to said control means, for cycling said motor between said inoperative state and said operative state and for selectively configuring said primary windings, said secondary windings, and said power lines in said operative state so as to provide first speed operation and second speed operation of said motor in response to said control means.

2. An improved regulating means as claimed in claim 1 wherein said fourth and fifth C2 contacts operate in a make-before-break relationship.

3. An improved regulating means as claimed in claim 1 wherein said C1 contactor selectively connects and disconnects said motor and one of said two power lines.

4. An improved regulating means as claimed in claim 3 wherein said C1 contactor includes said first C1 contact and a second C1 contact interconnected to said first and second power lines, respectively, said C1 contactor selectively connecting and disconnecting said motor and said two power lines.

* * * * *